United States Patent [19]
Weaver et al.

[11] 3,775,907
[45] Dec. 4, 1973

[54] ROOF SIDE RAIL WEATHER SEAL

[75] Inventors: John L. Weaver, Rochester; Edward H. Smoot, Holcomb, both of N.Y.

[73] Assignee: The Schlegel Manufacturing Company, Rochester, N.Y.

[22] Filed: July 31, 1972

[21] Appl. No.: 276,453

Related U.S. Application Data

[63] Continuation of Ser. No. 84,735, Oct. 28, 1970, abandoned.

[52] U.S. Cl. .................. 49/491, 49/493, 49/498
[51] Int. Cl. .............................................. E06b 7/22
[58] Field of Search ............... 49/491, 490, 493, 49/498, 488, 475; 296/28 R, 107, 116

[56] References Cited
UNITED STATES PATENTS

| | | | |
|---|---|---|---|
| 3,108,338 | 10/1963 | Stec et al. | 49/491 X |
| 3,448,543 | 6/1969 | Multer | 49/498 X |
| 2,737,412 | 3/1956 | Smith et al. | 49/493 |
| 2,746,103 | 5/1956 | Bright | 49/491 |
| 2,994,930 | 8/1961 | Cromwell | 49/498 |
| 3,411,244 | 11/1968 | Horner | 49/491 |
| 3,641,707 | 2/1972 | Kellos | 49/488 |

Primary Examiner—Mervin Stein
Assistant Examiner—Philip C. Kannan
Attorney—Eugene S. Stephens

[57] ABSTRACT

A roof side rail weather seal is mounted on a fin angled downward from the side rail and rests against a flat surface adjacent the fin. The base of the weather seal is formed of a dense, elastomeric material having a channel straddling the fin. A resilient wire framework in the channel squeezes the channel edges against the fin to support the weather seal in place. A relatively soft and compressible elastomeric sealing bridge integral with the base is formed of a cellular material engaging the top edge of a window glass approaching the flat surface to effect a seal between the glass and the rail.

4 Claims, 1 Drawing Figure

PATENTED DEC 4 1973
3,775,907
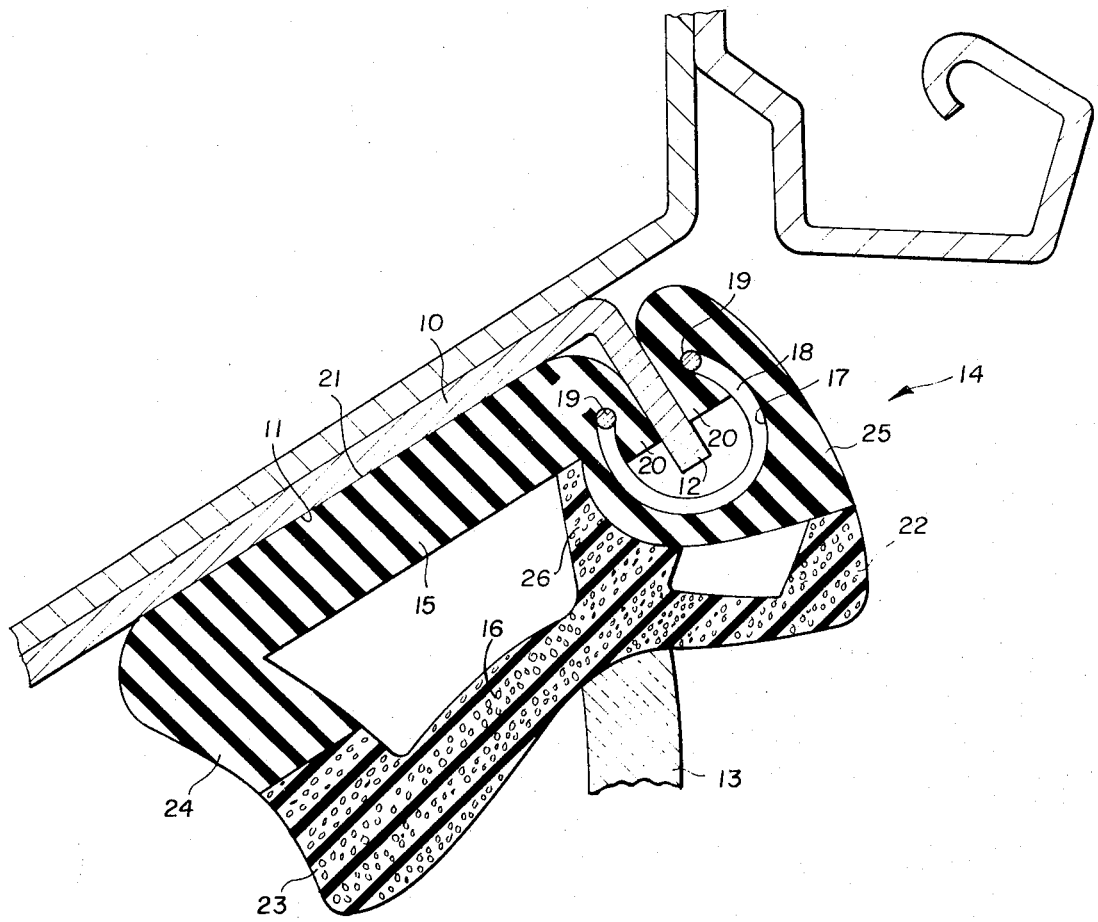
INVENTORS
JOHN L. WEAVER
EDWARD H. SMOOT
BY Cumpston, Shaw and Stephens
ATTORNEYS though one point of view is necessarily chosen in describing and defining the invention, this should not inhibit broader or related embodiments going beyond the semantic orientation of this application but falling within the spirit of the invention.

ROOF SIDE RAIL WEATHER SEAL

RELATED APPLICATIONS

This is a continuation of application Ser. No. 84,735, filed Oct. 28, 1970, now abandoned.

THE INVENTIVE IMPROVEMENT

In "hardtop" style automobiles, the top edge of the window glass in the door approaches the side rail of the roof, and an effective seal between the rail and the window glass has been a problem. Previously, a cellular elastomeric weather seal strip has been wedged or glued into a metal retainer attached to the rail. The invention involves recognition of a simpler and cheaper way to effect a weather seal at the roof side rail of a hardtop-style automobile, and the invention includes a preferred structure that is easily made and installed.

SUMMARY OF THE INVENTION

The inventive roof side rail weather seal is made for mounting on a fin or flange angled downward from the side rail adjacent a flat surface supporting the weather seal. The top edge of a window glass approaches the flat surface, and the weather seal effects a seal between the rail and the window glass. The seal is formed of a base of relatively firm and resilient material and a sealing bridge of relatively soft, compressible, and resilient material integral with the base. The base has a channel straddling the fin, and a resilient U-shaped metal frame in the channel squeezes the edges of the channel against the fin to hold the weather seal in place. The base has a portion resting against the flat surface of the rail, and the sealing bridge is spaced from the resting portion and joined to the base in the region of the channel and in a region spaced from the channel.

DRAWINGS

The drawing shows a cross-section of a preferred embodiment of the inventive weather seal secured in place at the roof side rail of a hardtop automobile.

DETAILED DESCRIPTION

Roof side rail 10 has a flat surface 11 and a fin 12 angled downwardly from rail 10 adjacent flat surface 11. Rail 10 is at the top of a doorway in a hardtop-style automobile, and window glass 13 is arranged to approach flat surface 11 when in the closed position illustrated. The inventive weather strip 14 effects a seal between rail 10 and glass 13.

Weather seal strip 14 is formed of a base 15 and a sealing bridge 16, with base 15 generally supporting strip 14 on rail 10, and sealing bridge 10 engaging glass 13 to effect a seal. Base 15 has a channel 17 straddling fin 12, and a resilient metal frame 18 preferably formed of wire is arranged in channel 17 so that the free ends 19 of frame 18 squeeze and pinch the inturned edges 20 of channel 17 tightly against fin 12 to hold strip 14 in place and to seal base 15 to fin 12. Base 15 also has a portion 21 resting against flat surface 11 to support and position strip 14 on rail 10.

Although many polymeric materials can be used, base 15 is preferably formed of a solid and relatively dense elastomeric material, and sealing bridge 16 is preferably formed of an elastomeric material in cellular form. Base 15 is thus relatively firm and resilient, and sealing bridge 16 is relatively soft, compressible, and resilient. Base 15 and sealing bridge 16 are preferably formed in a single extrusion to be integral with each other as illustrated.

One end 22 of bridge 16 is joined to base 15 in the region of channel 17 and the other end 23 of bridge 16 is joined to base 15 at the opposite end of base 15 spaced from channel 17. A portion 24 of base 15 extends downward from rail 10 to support the end 23 of bridge 16, and base portion 25 extends downward and outward from channel 17 and rail 10 to support the opposite end 22 of bridge 16. Bridge 16 also has a brace 26 extending to base 15 between ends 22 and 23, and window glass 13 preferably engages bridge 16 near brace 26. Bridge 16 is suspended and spaced from base 15 except for connections at its ends 22 and 23 and brace 26. Bridge 16 is thus disposed for resiliently and yieldingly engaging window glass 13 for a good seal. At the same time, base 15 of firmer material, is securely mounted on fin 12 and supports bridge 16 accurately in place on rail 10.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate that many materials and configurations can be used within the spirit of the invention and that the inventive weather seal can be adapted to many specific circumstances.

We claim:

1. In a roof side rail weather seal applied to a rail formed of metal to have a generally flat surface facing generally downward so the top edge of a window glass approaches said flat surface and a fin angled downward adjacent said flat surface, said weather seal being mounted on said fin and engaging said flat surface to effect a seal between said rail and said top edge of said window glass, the improvement comprising:
   a. a base of relatively firm and resilient polymeric material in a relatively dense and solid form;
   b. a sealing bridge of relatively soft, compressible, and pliable elastomeric polymeric material integral with said solid base and cellular in form;
   c. said solid base having a portion extending away from said fin and resting against said flat surface;
   d. said polymeric material of said solid base being firm enough to hold said resting portion snugly against said downward facing surface of said rail;
   e. said cellular sealing bridge being spaced below said solid resting portion and joined to an end region of said base on one side of said fin and joined to the opposite end region of said base on the other side of said fin to extend under said fin and reach from end to end of said base;
   f. said cellular sealing bridge extending from above and outside said window glass obliquely downward to below and inside said window glass; and
   g. said cellular sealing bridge extending for a distance of several times the thickness of said window glass to engage said window glass throughout the permissible range of closed positions of said window glass.

2. The weather seal of claim 1 wherein said sealing bridge has a brace extending to said resting portion between the extremities of said bridge.

3. The weather seal of claim 1 wherein said base has portions extending downward relative to said rail to support the ends of said sealing bridge.

4. The weather seal of claim 3 wherein said sealing bridge has a brace extending to said resting portion between the extremities of said bridge.

* * * * *